United States Patent
Otten

(10) Patent No.: US 7,426,858 B2
(45) Date of Patent: Sep. 23, 2008

(54) METHOD OF BALANCING A SUCTION UNIT COMPRISING A VENTILATOR AND AN ELECTRIC MOTOR

(75) Inventor: Wessel Adolf Otten, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 102 days.

(21) Appl. No.: 10/588,068

(22) PCT Filed: Jan. 25, 2005

(86) PCT No.: PCT/IB2005/050282

§ 371 (c)(1),
(2), (4) Date: Jul. 28, 2006

(87) PCT Pub. No.: WO2005/074106

PCT Pub. Date: Aug. 11, 2005

(65) Prior Publication Data

US 2007/0131027 A1    Jun. 14, 2007

(30) Foreign Application Priority Data

Jan. 29, 2004    (EP)    .................... 04100318

(51) Int. Cl.
*G01M 1/16*    (2006.01)

(52) U.S. Cl. ................. 73/468; 73/459; 73/66

(58) Field of Classification Search ............. 73/468, 73/459, 66; D32/21
See application file for complete search history.

(56) References Cited

U.S. PATENT DOCUMENTS 5,738,503 A * 4/1998 Schmidt-Marloh et al. ....... 417/423.7
2006/0115368 A1* 6/2006 Luedtke et al. ........... 417/423.1

FOREIGN PATENT DOCUMENTS

| DE | 195 01 959 | 7/1996 |
| EP | 0 962 660 | 12/1999 |
| JP | 08 065956 | 7/1996 |
| WO | WO 00/72740 | 12/2000 |
| WO | WO 2004/057195 | 7/2004 |

OTHER PUBLICATIONS

Kihara et al., "Translation of JP-08065956 A", Mar. 8, 1996.*

* cited by examiner

*Primary Examiner*—Hezron E. Williams
*Assistant Examiner*—Samir M. Shah

(57) ABSTRACT

A method of manufacturing an electrical suction unit for use in a vacuum cleaner includes a turbine unit and an electrical motor with a rotor and a stator. The turbine unit is attached to the rotor and forms, together with the rotor, a rotatable part of the suction unit, which is rotatable about an axis of rotation. An amount of material is removed from the rotor and from the turbine unit to torque-balance the rotatable part of the suction unit. In this manner, the amount of material to be removed from the rotor to torque-balance the rotatable part is considerably reduced, so that the adverse influence of the removal of the material from the rotor on the performance of the electrical motor is limited.

6 Claims, 3 Drawing Sheets

METHOD OF BALANCING A SUCTION UNIT COMPRISING A VENTILATOR AND AN ELECTRIC MOTOR

The invention relates to a method of manufacturing an electrical suction unit for a vacuum cleaner, which suction unit comprises a turbine unit and an electric motor with a rotor and a stator, wherein the turbine unit is mounted to the rotor and forms, together with the rotor, a part of the suction unit that is rotatable about an axis of rotation, according to which method an amount of material is removed from the rotor in order to torque-balance the rotatable part.

A number of terms as used in the description and in the claims are defined hereinafter with reference to FIGS. 1a and 1b.

Figure 1A:
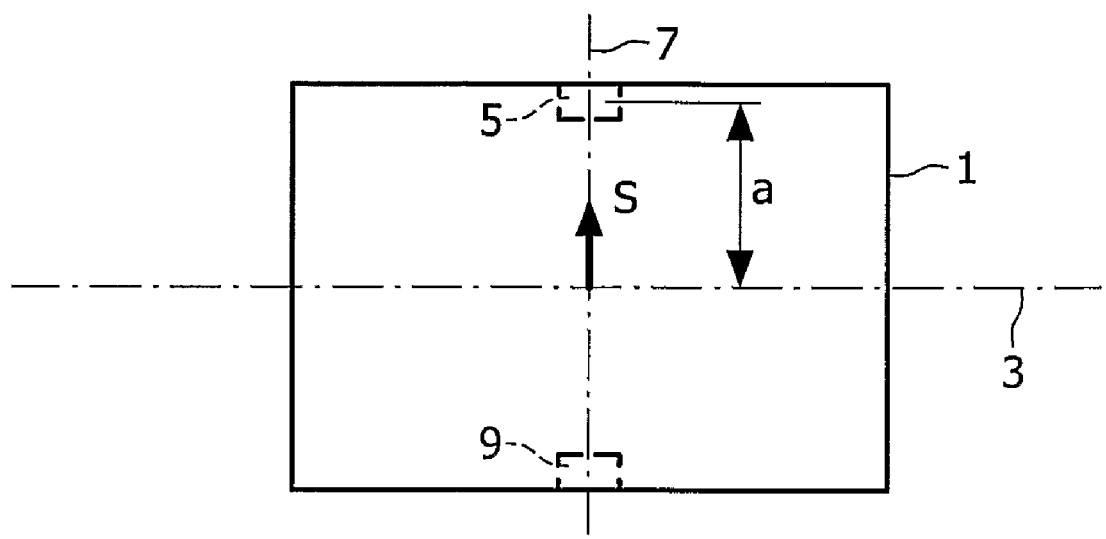

FIG. 1a shows a circularly cylindrical body 1 which is rotatable about an axis of rotation 3 which coincides with a center line of the body 1. If the body 1 has a uniform mass distribution, the center of gravity of the body 1 will be situated on the axis of rotation 3 and the body 1 will be capable of performing a true, balanced rotational movement about the axis of rotation 3. If, however, an amount of material 5 is removed from the body 1 at a location near a center plane 7 extending perpendicularly to the axis of rotation 3, then the body 1 will have so-termed static imbalance with respect to the axis of rotation 3. In FIG. 1a, this static imbalance is shown by means of a vector S with a direction that is determined by the position of the amount of material 5 with respect to the axis of rotation 3, and a size (in kg.m) that is determined by the mass of the amount of material 5 and the distance a between the amount of material 5 and the axis of rotation 3. If the body 1 is rotatably bearing-mounted near the ends of the axis of rotation 3, the static imbalance S during the rotation of the body 1 will lead to mutually equally large and equally directed varying forces on the bearings. By removing from the body 1 an equally large amount of material 9 at a position diagonally opposite the amount of material 5, the body 1 becomes statically balanced, as a result of which said varying forces on the bearings disappear.

Figure 1B:
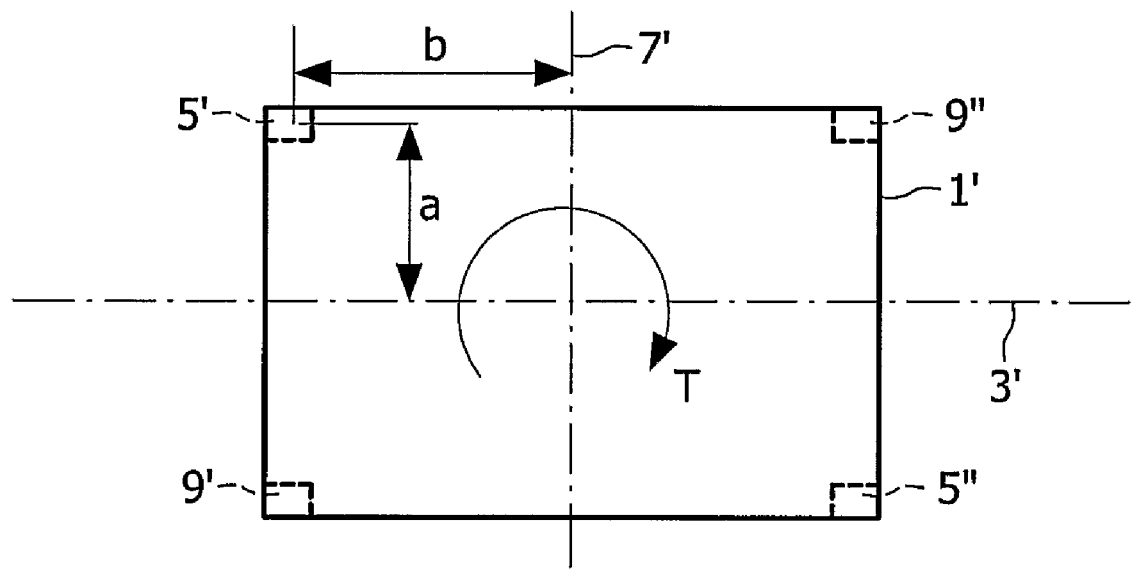

In the case of the body 1' shown in FIG. 1b, an amount of material 5' and an equal amount of material 5" are removed near the two end faces of the body 1'. The amounts of material 5' and 5" are situated however in mutually opposite positions with respect to the axis of rotation 3'. As a result the body 1' exhibits a so-termed torque imbalance with respect to the axis of rotation 3'. This torque imbalance is shown in FIG. 1b by means of a torque vector T having a direction that is determined by the positions of the amounts of material 5', 5" with respect to the axis of rotation 3', and a size (in kg.m$^2$) that is determined by the respective mass of the amounts of material 5', 5", the distance a between the amounts of material 5', 5" and the axis of rotation 3' and the distance b between the amounts of material 5', 5" and the center plane 7'. If the body 1' is rotatably mounted near the ends of the axis of rotation 3', the torque imbalance T during the rotation of the body 1' will lead to equally large and oppositely directed varying forces on the bearings. By removing equally large amounts of material 9', 9" at positions diagonally opposite the amounts of material 5', 5", the body 1' becomes torque-balanced, as a result of which said varying forces on the bearings disappear.

A method of manufacturing an electrical suction unit of the type mentioned in the opening paragraph is generally known and commonly used. The torque imbalance of the rotatable part of the suction unit after assembly is mainly caused in the majority of cases by the fact that the rotor of the electric motor has an inherent torque imbalance. Said torque imbalance of the rotor is caused by the fact that the rotor comprises a large number of parts that are assembled together, such as a number of electric coils, a laminated soft-iron core, and a commutator. According to the known method, the rotatable part is torque-balanced by removing an amount of material from the rotor, for example from the soft-iron core. For this purpose, the rotor is separately mounted onto a balancing machine by means of which the position and the amount of the material to be removed is determined. Subsequently, the rotor and the turbine unit are assembled together.

A drawback of the known method resides in that the amount of material to be removed from the rotor in order to torque-balance the rotatable part is comparatively large. It has been found that the electrical performance of the motor is adversely affected thereby. With respect to the manufacture of electrical suction units operating at comparatively high speeds of rotation, in which case the rotor comprises generally a comparatively small amount of core material, it has even been found that the known method is not applicable because the amount of core material that can be removed without impermissible reductions in motor performance is insufficient to enable the rotatable part to be torque-balanced.

It is an object of the invention to provide a method of manufacturing an electrical suction unit of the type mentioned in the opening paragraph, wherein the amount of material to be removed from the rotor in order to torque-balance the rotatable part of the suction unit is reduced considerably.

To achieve the above-mentioned object, a method in accordance with the invention for manufacturing an electrical suction unit is characterized in that in order to torque-balance the rotatable part, an amount of material is removed also from the turbine unit. The rotor and the turbine unit of a suction unit manufactured in accordance with a method according to the invention each individually cause a torque imbalance of the rotatable part of the suction unit. Said torque imbalances of the rotor and the turbine unit cancel each other, however, in such a manner that the rotatable part as a whole is sufficiently or completely torque-balanced. Thus, as torque-balancing of the rotatable part does not require the rotor itself to be torque-balanced, only a comparatively small amount of material has to be removed from the rotor.

As the rotor furthermore has a comparatively large mass, the center of gravity of the rotatable part is situated close to or even in the rotor. As the turbine unit is situated at a distance from the rotor, the amount of material to be removed from the turbine unit has a comparatively large torque arm with respect to said center of gravity. As a result, the amount of material to be removed from the turbine unit has a comparatively great influence on the torque balance of the rotatable part, so that also the amount of material to be removed from the turbine unit is only comparatively small.

A particular embodiment of a method in accordance with the invention is characterized in that the amount of material that is removed from the rotor is situated near a side of the rotor facing away from the turbine unit. As the rotor has a comparatively large mass, the center of gravity of the rotatable part of the suction unit is situated close to the side of the rotor facing the turbine unit. As, in this particular embodiment, the amount of material to be removed from the rotor is situated near the side of the rotor facing away from the turbine unit, the amount of material to be removed from the rotor has a torque arm which is as large as possible with respect to said center of gravity. As a result, the necessary amount of material to be removed from the rotor is further reduced.

A particular embodiment of a method in accordance with the invention is characterized in that the amount of material that is removed from the rotor is situated in a plane extending perpendicularly to the axis of rotation and through a center of gravity of the rotatable part. In this particular embodiment, the rotatable part of the suction unit is torque-balanced by removing an amount of material solely from the turbine unit. The static imbalance of the rotatable part due to the removal of said material from the turbine unit is compensated for by the removal of said amount of material from the rotor. As the amount of material to be removed from the rotor is situated in said plane through the center of gravity, this amount of material has no influence on the torque balance of the rotatable part.

A further embodiment of a method in accordance with the invention is characterized in that by removing the amount of material from the turbine unit, the turbine unit itself is provided with a static imbalance equal to and oppositely directed to a static imbalance with which the rotor itself is provided by the removal of the amount of material from the rotor. In this manner it is achieved that the torque-balancing of the rotatable part does not lead to a static imbalance of the rotatable part.

Yet another embodiment of a method in accordance with the invention is characterized in that in a first step, a torque imbalance of the rotor itself is measured, in a second step the static imbalance with which the turbine unit and the rotor are to be provided to compensate for the measured torque imbalance of the rotor is predetermined, in a third step, the rotor is provided with the predetermined static imbalance, in a fourth step, the rotor is mounted to the turbine unit, and in a fifth step, the rotatable part is torque-balanced by providing the turbine unit with the predetermined static imbalance. In this manner it is achieved that, in a phase of the method where the rotatable part is already assembled and is being balanced by means of a balancing machine, material has to be removed solely from the turbine unit. This leads to a simplification of the method and in particular of the calibration of the balancing machine.

The invention further relates to a vacuum cleaner which is provided with an electrical suction unit manufactured in accordance with a method according to the invention.

Figure 2:
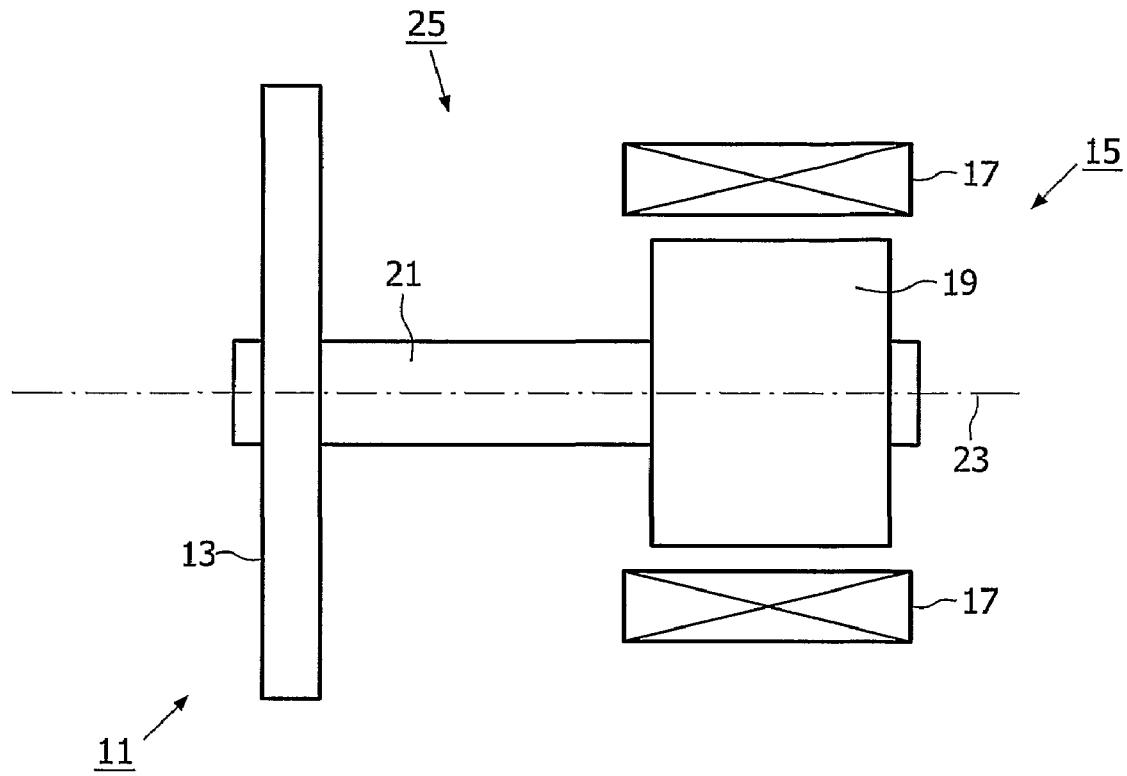
Figure 3:
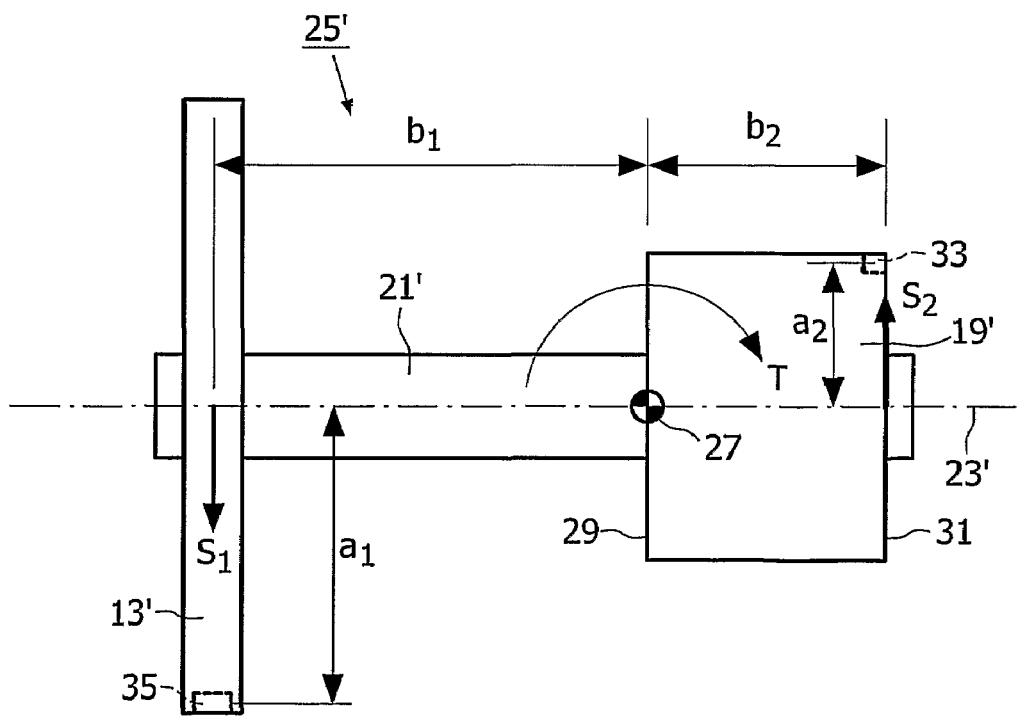
Figure 4:
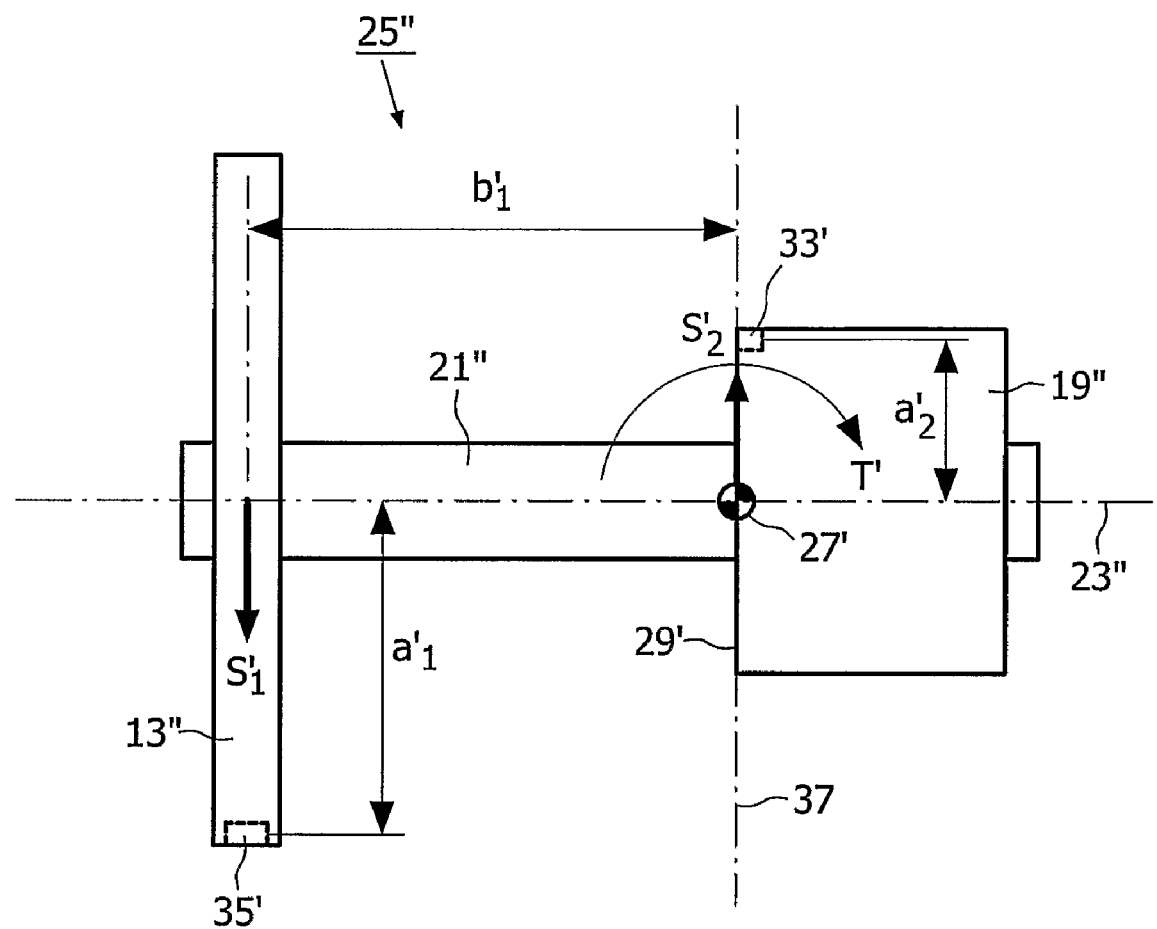

Embodiments of a method in accordance with the invention for the manufacture of an electrical suction unit are illustrated hereinbelow with reference to the drawings, in which FIGS. 1a and 1b illustrate definitions of, respectively, the term static imbalance and the term torque imbalance;

FIG. 2 diagrammatically shows an electrical suction unit manufactured in accordance with a method according to the invention;

FIG. 3 diagrammatically shows a rotatable part of an electrical suction unit manufactured in accordance with a first embodiment of a method according to the invention; and FIG. 4 diagrammatically shows a rotatable part of an electrical suction unit manufactured in accordance with a second embodiment of a method according to the invention.

FIG. 2 diagrammatically shows the most important parts of an electrical suction unit 11 which is manufactured in accordance with a method of the invention. The suction unit 11 can suitably be used in a vacuum cleaner, which will neither be discussed in detail hereinbelow nor further illustrated in the Figures. The suction unit 11 comprises a turbine unit 13 and an electric motor 15 which includes a stator 17 and a rotor 19. The turbine unit 13 is mounted to the rotor 19 via a central shaft 21 and forms, together with the rotor 19 and the central shaft 21, a part 25 of the suction unit 11 that can be rotated about an axis of rotation 23. The stator 17 is attached to a housing (not shown) of the suction unit 11. The central shaft 21 is rotatably mounted in said housing by means of bearings (not shown). In operation, the turbine unit 13 is driven in rotation by means of the motor 15, as a result of which the suction unit 11 generates in said vacuum cleaner an air flow and a partial vacuum which are necessary for the sucking action of the vacuum cleaner.

Without further measures, the rotatable part 25 of the suction unit 11 would exhibit a torque imbalance after assembly, which leads to undesirable, varying forces on the bearings of the central shaft 21 and to vibrations of the suction unit 11. Said torque imbalance is caused predominantly by a torque imbalance of the rotor 19 of the electric motor 15. Said torque imbalance of the rotor 19 is caused by the fact that the rotor 19 comprise a large number of mutually assembled parts, such as a number of electric coils, a laminated soft-iron core and a commutator, which are not shown in further detail in the Figures for the sake of simplicity. In the following, two embodiments of a method in accordance with the invention for the manufacture of the suction unit 11 are described, wherein for the purpose of torque-balancing the rotatable part 25, amounts of material are removed from the rotor 19 and from the turbine unit 13.

FIG. 3 shows a rotatable part 25' of a suction unit manufactured in accordance with a first embodiment of a method according to the invention. In FIG. 3, parts of the rotatable part 25' which correspond to parts of the rotatable part 25 of the suction unit 11 shown in FIG. 2 are indicated by means of corresponding reference numerals. According to the first embodiment of the method, in a first step a torque imbalance is measured which is inherent to the rotor 19' after assembly of the rotor 19'. To measure the torque imbalance use can be made of a conventional balancing machine. The measured torque imbalance is shown in FIG. 3 by means of a torque vector T around a center of gravity 27 of the rotatable part 25'. In most cases, the center of gravity 27 is situated near a side face 29 of the rotor 19' facing the turbine unit 13' because the mass of the rotor 19' is much larger than the mass of the turbine unit 13'. For the sake of simplicity, the center of gravity 27 in FIG. 3 is drawn in the side face 29, however, it is noted that this is not to be construed in any way as limiting the scope of protection of the invention.

In accordance with the first embodiment of the method, the rotatable part 25' is torque-balanced, i.e. the torque imbalance T of the rotor 19' is compensated for by providing equally large, yet oppositely directed static imbalances $S_1$ and $S_2$ at the location of, respectively, turbine unit 13' and a side face 31 of the rotor 19' facing away from the turbine unit 13'. The necessary size of the static imbalances $S_1$ and $S_2$ is predetermined, in a second step of the method, on the basis of the size of the measured torque imbalance T and the distances $b_1$ and $b_2$ from the static imbalances $S_1$ and $S_2$ to be provided to the center of gravity 27. Subsequently, in a third step of the method, the predetermined static imbalance $S_2$ is provided on the rotor 19'. This takes place by removing an amount of material 33 from the rotor 19', for example from the soft-iron core, at a location near the side face 31 at a distance $a_2$ to the axis of rotation 23'. The amount of material 33 to be removed is determined by the size of the static imbalance $S_2$ to be provided and by the distance $a_2$.

Subsequently, in a fourth step of the method, the turbine unit 13', the rotor 19' and the central shaft 21' are assembled into the rotatable part 25', so that the rotor 19' is secured to the turbine unit 13'. In a fifth step of the method, the rotatable part 25' thus assembled is mounted on a conventional balancing machine. Said balancing machine measures the static imbalance $S_2$. The balancing machine is calibrated such that a static imbalance necessary to compensate for the measured static imbalance $S_2$ is provided by the balancing machine on the turbine unit 13' at a distance $b_1$ to the center of gravity 27. Said compensating static imbalance provided on the turbine unit 13' will be equally large as, yet oppositely directed to, the static imbalance $S_2$, i.e. approximately equal to the predetermined static imbalance $S_1$, so that the rotatable part 25' becomes torque-balanced. The static imbalance $S_1$ is provided by removing an amount of material 35 from the turbine unit 13', for example at a location near the circumference of the turbine unit 13', at a distance $a_1$ to the rotation axis 23'. The amount of material 35 to be removed is determined by the size of the static imbalance $S_1$ to be provided and by the distance $a_1$.

As, according to the method of the invention, an amount of material 35 is removed from the turbine unit 13' in order to torque-balance the rotatable part 25', the amount of material 33 which is to be removed from the rotor 19' in order to torque-balance the rotatable part 25' is limited substantially. As the center of gravity 27 is situated near the side face 29 of the rotor 19', the distance $b_1$, i.e. the torque arm of the static imbalance $S_1$ of the turbine unit 13', is comparatively large, so that the amount of material 35 has a comparatively great influence on the torque balance of the rotatable part 25'. As a result, the amount of material 35 to be removed from the turbine unit 13', and also the amount of material 33 to be removed from the rotor 19' are limited. As the amount of material 33 to be removed from the rotor 19' is situated near the side face 31 of the rotor 19' facing away from the turbine unit 13', the distance $b_2$, i.e. the torque arm of the static imbalance $S_2$ of the rotor 19', is as large as possible, so that the amount of material 33 to be removed from the rotor 19' is further reduced. As the static imbalances $S_1$ and $S_2$ necessary to torque-balance the rotatable part 25' are predetermined such that they are equally large yet oppositely directed, it is achieved that the provision of the static imbalances $S_1$ and $S_2$ does not lead to an additional static imbalance of the rotatable part 25'. In addition, it is thus achieved that the torque-balancing of the rotatable part 25', as described above in the fifth step of the method, can take place in a comparatively simple manner by measuring and compensating the static imbalance $S_1$ provided on the rotor 19' in the third step of the method. As a result, the torque-balancing process and the balancing machine necessary for this process are simplified. The balancing process and the balancing machine necessary for this purpose are also simplified by the fact that, in the fifth step of the method in which the rotatable part 25' is assembled already and is being balanced by means of the balancing machine, material is removed solely from the turbine unit 13'. As the amount of material 33 to be removed from the rotor 19' is comparatively small, it is achieved that the removal of the material 33 from the rotor 19' has as little influence as possible on the performance of the electric motor 15. The method in accordance with the invention is particularly suited for suction units operating at a comparatively high rotational speed, because the rotor of the electric motor of such a suction unit comprises only a comparatively small amount of core material.

FIG. 4 shows a rotatable part 25" of a suction unit manufactured in accordance with a second embodiment of a method of the invention. In FIG. 4, parts of the rotatable part 25" which correspond to parts of the rotatable part 25' shown in FIG. 3 are indicated by means of the same reference numerals. Analogously to the above-described first embodiment of the method, in a first step according to the second embodiment of the method, a torque imbalance which is inherent to the rotor 19" is measured after assembly of the rotor 19". The measured torque imbalance is shown in FIG. 4 by means of a torque vector T' around a center of gravity 27' of the rotatable part 25".

The second embodiment of the method according to the invention differs basically from the first embodiment of the method in that the rotatable part 25" is torque-balanced by the provision of equally large, yet oppositely directed static imbalances $S_1'$ and $S_2'$ at the location of, respectively, turbine unit 13' and a plane 37 which extends perpendicularly to the axis of rotation 23" and through the center of gravity 27' of the rotatable part 25". In the example shown, in which the center of gravity 27' lies approximately in the side face 29' of the rotor 19" facing the turbine unit 13", the static imbalance is thus provided in the side face 29' of the rotor 19". The necessary size of the static imbalances $S_1'$ and $S_2'$ is predetermined, in a second step of the method, on the basis of the size of the measured torque imbalance T' and the distance $b_1'$ from the static imbalance $S_1'$ to be provided to the center of gravity 27'. Subsequently, in a third step of the method, the predetermined static imbalance $S_2'$ is provided on the rotor 19'. This is achieved by removing an amount of material 33' from the rotor 19" at a location near the side face 29' at a distance $a_2'$ to the axis of rotation 23". The amount of material 33' to be removed is determined by the size of the static imbalance $S_2'$ to be provided and by the distance $a_2'$.

Subsequently, in a fourth step of the method, the turbine unit 13', the rotor 19" and the central axis 21" are assembled into the rotatable part 25", so that the rotor 19" is secured to the turbine unit 13". In a fifth step of the method, the rotatable part 25" thus assembled is mounted on a conventional balancing machine. Said balancing machine measures the static imbalance $S_2'$. The balancing machine is calibrated such that a static imbalance necessary to compensate for the measured static imbalance $S_2'$ is provided by the balancing machine on the turbine unit 13" at the distance $b_1'$ to the center of gravity 27'. The compensating static imbalance provided on the turbine unit 13" will be equally large as, yet oppositely directed to, the static imbalance $S_2'$, i.e. approximately equal to the predetermined static imbalance $S_1'$, so that the rotatable part 25" becomes torque-balanced. The provision of the static imbalance $S_1'$ takes place by the removal of a quantity of material 35' from the turbine unit 13" at a distance $a_1'$ to the axis of rotation 23". The amount of material 35' to be removed is determined by the size of the static imbalance $S_1'$ to be provided and by the distance $a_1'$.

According to the second embodiment of the method of the invention, the torque imbalance T' is thus compensated solely by means of the static imbalance $S_1'$ provided in the turbine unit 13". Said static imbalance $S_1'$ is statically compensated by means of the static imbalance $S_2'$ provided in the rotor 19'". As the amount of material 33' to be removed from the rotor 19" is situated in the plane 37 through the center of gravity 27', the static imbalance $S_2'$ has no influence on the torque balance of the rotatable part 25" provided by means of the static imbalance $S_1'$.

In the above-described embodiments of the method of the invention, the rotatable part 25', 25" is mounted, after assembly, on a conventional balancing machine, after which the turbine unit 13', 13" is provided with the necessary static imbalance $S_1$, $S_1'$. It is noted that the invention also includes embodiments wherein, following its assembly, the rotatable part is mounted, together with the stator of the electric motor, in the housing of the suction unit, after which the assembled suction unit is mounted on the balancing machine and the rotatable part is balanced in the suction unit.

In the above-described embodiments of the method according to the invention, the amounts of material 33, 33', 35, 35' to be removed from the rotor 19', 19", respectively, and the turbine unit 13', 13", respectively, are removed from positions which are as remote as possible from the axis of rotation 23', 23", respectively. It is noted that the invention also includes embodiments wherein the material to be removed is removed from positions which are closer to the axis of rotation. In these alternative embodiments, the amount of material to be removed is generally larger, but the alternative embodiments offer a wider choice as regards the positions where the material is removed.

The invention claimed is:

1. A method of manufacturing an electrical suction unit for a vacuum cleaner, said suction unit comprises a turbine unit and an electric motor with a rotor and a stator, wherein the method comprises the following acts:
   mounting the turbine unit to the rotor to form, together with the rotor, a part of the suction unit that is rotatable about an axis of rotation,
   removing an amount of material from the rotor in order to torque-balance the rotatable part, and
   in order to torque-balance the rotatable part, removing an amount of material from the turbine unit.

2. The method as claimed in claim 1, wherein the amount of material that is removed from the rotor is situated near a side of the rotor facing away from the turbine unit.

3. The method as claimed in claim 2, wherein by removing the amount of material from the turbine unit, the turbine unit itself is provided with a static imbalance equal to and oppositely directed to a static imbalance with which the rotor itself is provided by the removal of the amount of material from the rotor.

4. The method as claimed in claim 3, further comprising the acts of:
   measuring a torque imbalance of the rotor itself,
   determining a static imbalance with which the turbine unit and the rotor are to be provided to compensate for the measured torque imbalance of the rotor,
   providing the rotor with the static imbalance,
   mounting the rotor to the turbine unit, and
   torque-balancing the rotatable part by providing the turbine unit with the static imbalance.

5. The method as claimed in claim 1, wherein the amount of material that is removed from the rotor is situated in a plane extending perpendicularly to the axis of rotation and through a center of gravity of the rotatable part.

6. A vacuum cleaner which is provided with the electrical suction unit manufactured in accordance with the method as claimed in claim 1.

* * * * *